Figure 1:
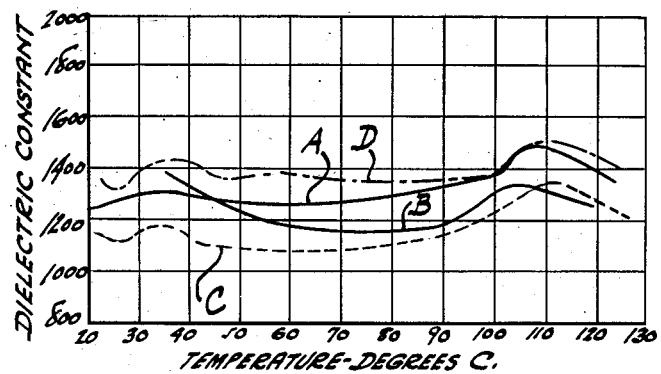

July 21, 1953  E. WAINER  2,646,359

MODIFIED BARIUM TITANATE CERAMIC MATERIALS

Filed April 10, 1951

INVENTOR
EUGENE WAINER
BY
ATTORNEY

Patented July 21, 1953

2,646,359

UNITED STATES PATENT OFFICE 2,646,359

MODIFIED BARIUM TITANATE CERAMIC MATERIALS

Eugene Wainer, Cleveland, Ohio, assignor, by mesne assignments, to Radio Corporation of America, a corporation of Delaware Application April 10, 1951, Serial No. 220,162

8 Claims. (Cl. 106—39)

This invention relates to novel ceramic materials having high values of dielectric constant which remain relatively uniform over broad ranges of temperature.

More particularly, the invention relates to ceramic materials comprising barium titanate and minor amounts of certain columbates and tantalates.

Prior art

Barium titanate ceramics have previously been prepared and have been found to have unusually high values of dielectric constant with relatively low loss values. Barium titanate ceramics have also been found to possess excellent piezoelectric properties if a polarization voltage is first applied across the ceramic for a short time. Because of these useful properties, barium titanate ceramics have been used as capacitors and as transducers.

A factor which limits the use of barium titanate ceramics in capacitors, however, is their relatively low Curie temperature of about 116° C. and the fact that, in the Curie point region, the dielectric constant of barium titanate ceramics rises sharply to a very high peak. Thus, in the temperature range of about 80°–150° C., the electrical properties vary so greatly that these ceramics cannot be used in many applications where good stability is required.

Barium titanate ceramics have also previously been prepared with various other materials included. Among the materials which have been combined with barium titanate ceramics to modify their properties are: titanium dioxide, stannic oxide, alkaline earth stannates, lead titanate, magnesium titanate, calcium titanate, strontium titanate, alkaline earth fluorides, and alkaline earth zirconates.

Present invention

The present invention is based on the discovery that the addition of minor amounts of any one of sodium, potassium, or cadmium columbates or tantalates to barium titanate ceramic material results in the formation of novel ceramic materials which have much greater stability of electrical properties over broad, practical temperature ranges than barium titanate, alone. The Curie point peak in the curve of dielectric constant of barium titanate ceramic is almost entirely eliminated in the materials of the present invention. Moreover, the materials of the present invention exhibit dielectric constants and dissipation factors which are nearly as good as those of barium titanate, alone.

The novel materials of the present invention are vitreous ceramics comprising a major proportion of barium titanate and from about 0.5 to about 50 percent by weight of a material from the class consisting of sodium and potassium columbates and tantalates or from about 0.5 to about 20 percent by weight of cadmium columbate or tantalate.

Objects of the invention

One object of the present invention is to provide novel ceramic materials having good stability of electrical properties at practical use temperatures.

Another object of the invention is to provide novel ceramic materials having high dielectric constants which remain substantially uniform over relatively broad temperature ranges.

Another object of the invention is to provide an improved method of stabilizing the dielectric properties of barium titanate ceramics.

Still another object of the invention is to provide a method of substantially eliminating the Curie point peak in the curve of dielectric constant normally associated with barium titanate ceramics.

Figure 2:
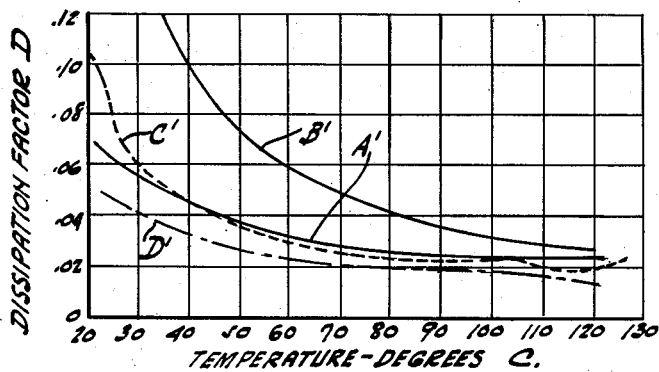

These and other objects will be more apparent and the invention will be more readily understood from the following detailed description and the accompanying drawing, of which:

Figure 1 is a graph showing variations of dielectric constant with temperature for certain compositions of various materials within the present invention, Figure 2 is a graph showing variations of dissipation factor with temperature for the same compositions for which data have been plotted on the graph of Figure 1.

Methods of preparation

In general, the materials of the present invention are prepared by, first, separately calcining suitable quantities of substances which will separately form barium titanate and the particular one of the columbates or tantalates to be added. The titanate and the columbate or tantalate, as the case may be, are then homogeneously mixed and fired to vitrification temperature for a brief period of time in oxygen or air.

EXAMPLE I

A mixture was prepared consisting of 90 percent by weight barium titanate and 10 percent by weight sodium columbate. The preparation of sodium columbate and the other alkali metal columbates or tantalates, as well as the alkaline earth metal columbates or tantalates, in their ceramic form, has been fully disclosed in copending application, Serial No. 159,094, of Eugene Wainer, filed April 29, 1950. The sodium columbate may, for example, be prepared by mixing equimolar quantities of sodium carbonate and pure $Cb_2O_5$ and calcining at about 1900° F. in an atmosphere of oxygen. The oxygen may be either at atmospheric pressure or any pressure above atmospheric. Firing time during calcination should be as short as feasible, usually ½ hour to 2 hours. The mixture of the carbonate and a columbate may have incorporated with it about 10 percent by weight of a 2 percent by weight aqueous solution of methyl cellulose as a temporary binder, and may then be molded to any desired shape for firing. The molded body is then fired at about 2500° F. in air or oxygen for about 1 hour. The firing temperature is not critical except that the temperature must be sufficiently high to vitrify the product. It is desirable to use as low a temperature and as short a time as will produce uniform vitrification. The ceramic body thus produced may be aged by being permitted to stand at room temperature for 2 weeks or more. The aging effect may be facilitated by annealing the body, after firing, at a temperature of about 1000° F. for one hour.

Overall range of firing temperatures suitable for firing any of the materials of the present invention is from about 2200° F. to about 2600° F. Optimum firing temperature for barium titanate, itself, is about 2450°–2500° F. As the amount of columbate or tantalate addition increases, the temperature of vitrification decreases. A body composed of 50% barium titanate and 50% sodium columbate has a vitrification temperature of about 2300°–2400° F. Bodies having potassium columbate as the additive have still lower vitrification temperatures, so that at about 50% addition of the potassium compound, vitrification temperature is 2200°–2300° F. The same general result is obtained by adding cadmium columbate. A 20% addition of the cadmium compound results in a vitrification temperature, in an oxygen atmosphere, of 2100°–2200° F., the latter temperature being preferred. Using lesser amounts of cadmium columbate, the composition will vitrify in the range of 2300°–2500° F., with 2450° F. being the preferred temperature.

Although it is desirable to fire the bodies of the present invention at the lowest possible vitrification temperatures, care must be taken that the bodies are completely vitrified. When the above ranges of temperature are used, both of these conditions are met.

Range of firing times is dependent upon the size of the bodies. Bodies having a thickness of less than 0.1 inch may be completely fired in a time period of 20–30 minutes. Bodies of the order of 0.1–0.3 inch in thickness requires a firing time of 30 minutes to 1 hour. If the thickness of the body is around 0.5 inch, a firing time of at least 2 hours should be provided.

Air or oxygen firing atmospheres or mixtures of air and oxygen may be used but oxygen, alone, produces best results in all cases.

The annealing process should be carried out for periods of about one hour at temperatures of about 1000°–1200° F. Neither the temperature nor the time is particularly critical, however. The principal requirement is that the temperature soaking be carried out for a sufficient time to affect the whole body and that the annealing temperature be lower than the vitrification temperature.

*Properties of the present materials*

The following comparison may be made between the properties of a barium titanate ceramic without modifiers added and the ceramic material prepared as above described. Pure barium titanate ceramic has a dielectric constant in the range of about 1150–1600 over a temperature range of about 20° C. to 70° C. At about 70° C., both dielectric constant and power factor start to increase rapidly, the dielectric constant changing from an average value of about 1300 to about 7000 at a temperature of 110° C.–120° C. Within this latter temperature range, the body is very weak mechanically, due to the shifting from tetragonal to cubic structure. In view of the broad change in dielectric constant, characteristics of any circuit in which pure barium titanate capacitors are a part are drastically and disadvantageously changed if the ambient temperature is allowed to rise above 70° C. The material of the present invention, prepared as above described, on the other hand, has a dielectric constant of about 1250 at 20° C. and about 1350 at 100° C. Moreover, between 100° and 120° C., the dielectric constant varies only about 150 points. The variation of dielectric constant with temperature, between 20° and 120° C., for the material of the present invention, as described in the above example, is shown in curve A of Figure 1. Its dielectric constant varies less than 25% between 20° C. and 130° C., compared to a variation of 600–700 percent for pure barium titanate. It will also be noted that, at room temperature, the dielectric constant of the material which consists of 90 percent by weight of barium titanate and 10 percent by weight of sodium columbate is nearly the same as that of pure barium titanate.

Curves B, C, and D of Figure 1 show the variation of dielectric constant with temperature, between about 20° C. and about 130° C., for the ceramic materials having the compositions 90 percent $BaTiO_3$—10 percent $KCbO_3$, 90 percent $BaTiO_3$—10 percent $NaTaO_3$, and 90 percent $BaTiO_3$—10 percent $KTaO_3$, respectively. In all cases, it has been found, as shown by the data plotted in Figure 1, that the dielectric constant, within the temperature range chosen, remains relatively uniform.

TABLE 1

| Composition | C, mmfd. | D, Dissipation Factor | ε, Dielectric Constant |
|---|---|---|---|
| $BaTiO_3$–100% | 510 | .02 | 1,401 |
| 99% $BaTiO_3$–1% $NaCbO_3$ | 720 | .51 | 1,790 |
| 98% $BaTiO_3$–2% $NaCbO_3$ | 800 | .56 | 1,760 |
| 95.25% $BaTiO_3$–4.75% $NaCbO_3$ | 590 | .31 | 1,490 |
| 90% $BaTiO_3$–10% $NaCbO_3$ | 450 | .07 | 1,250 |
| 75% $BaTiO_3$–25% $NaCbO_3$ | 545 | .16 | |
| 50% $BaTiO_3$–50% $NaCbO_3$ | 388 | .39 | |
| 99% $BaTiO_3$–1% $KCbO_3$ | 620 | 1.04 | 1,620 |
| 98% $BaTiO_3$–2% $KCbO_3$ | 650 | 1.08 | 1,430 |
| 95.25% $BaTiO_3$–4.75% $KCbO_3$ | 610 | .91 | 1,580 |
| 90% $BaTiO_3$–10% $KCbO_3$ | 490 | .56 | 1,330 |
| 85% $BaTiO_3$–15% $KCbO_3$ | 610 | .75 | 1,560 |
| 75% $BaTiO_3$–25% $KCbO_3$ | 577 | .69 | |
| 50% $BaTiO_3$–50% $KCbO_3$ | 485 | .69 | |
| 99% $BaTiO_3$–1% $NaTaO_3$ | 570 | .42 | 1,700 |
| 95.25% $BaTiO_3$–4.75% $NaTaO_3$ | 610 | .15 | 1,580 |
| 90% $BaTiO_3$–10% $NaTaO_3$ | 430 | .11 | 1,080 |
| 85% $BaTiO_3$–15% $NaTaO_3$ | 310 | .033 | 900 |
| 75% $BaTiO_3$–25% $NaTaO_3$ | 230 | .28 | |
| 50% $BaTiO_3$–50% $NaTaO_3$ | 110 | .24 | |
| 99% $BaTiO_3$–1% $KTaO_3$ | 480 | .43 | 1,000 |
| 98% $BaTiO_3$–2% $KTaO_3$ | 530 | .51 | 1,300 |
| 95.25% $BaTiO_3$–4.75% $KTaO_3$ | 480 | .16 | 1,350 |
| 90% $BaTiO_3$–10% $KTaO_3$ | 400 | .05 | 1,130 |
| 85% $BaTiO_3$–15% $KTaO_3$ | 350 | .02 | 950 |
| 75% $BaTiO_3$–25% $KTaO_3$ | 290 | .50 | |
| 50% $BaTiO_3$–50% $KTaO_3$ | 305 | .86 | |

Curves A', B', C', and D' of Figure 2 show how the electrical dissipation factor varies with temperature for the same compositions for which data are shown in Figure 1. The material of curve A' in Figure 2 is the same as that of curve A in Figure 1, etc. These data show that, in general, the dissipation factors of the materials of the present invention decrease with increasing temperature. This is of considerable advantage for many applications where the temperature of a ceramic element rises when the element is in normal use.

Electrical properties such as capacitance, dielectric constant, and electrical dissipation factor, have been measured for many compositions of materials within the scope of the present invention and the values for some of these are found in Table 1 below. This table contains data only for those materials which comprise barium titanate and any one of sodium or potassium columbate or tantalate. Capacitance has been given in micro-micro-farads.

The data shown in the above table indicate that the dielectric constant and the capacitance of barium titanate can be increased by adding small percentages of either sodium or potassium columbate or tantalate. The minimum amount of the addition which is significant in changing the properties of the barium titanate is about 0.5%. A maximum in the values of dielectric constant and capacitance appears to occur in ceramics having about 2 percent by weight of the additive material. The materials which comprise 98 percent barium titanate and 2 percent of the additive by weight, therefore, are to be regarded as preferred embodiments of the materials within the present invention.

It will also be noted that a minimum in the dissipation factor value occurs where the constituents are present in the proportions of about 90 percent barium titanate to 10 percent of the additive and these materials are also preferred for some applications since, in all cases, they also have relatively high dielectric constants.

In general, the materials shown in the above table have relatively high dielectric constants at room temperature and also relatively uniform values of dielectric constant between 20° and 120° C. This is one of their most useful properties and illustrates one of the greatest improvements obtained by adding these particular columbates and tantalates to barium titanate ceramic.

It has also been found that cadmium columbate exerts a similar effect on barium titanate ceramic when added to the titanate in amounts up to about 20 percent by weight. A series of compositions was prepared in which the relative amounts of barium titanate and cadmium columbate or tantalate were varied. The results of measurements made of certain electrical properties of those materials in which the columbate was included are given in Table 2 below:

factor is lowest for those materials containing about 10 percent to 15 percent cadmium columbate. A minimum amount of cadmium columbate which is desirable to use in the materials of the present invention is about 0.5 percent.

As, in the case of those materials in which the additive was sodium or potassium columbate or tantalate, the materials formed by addition of cadmium columbate or tantalate show elimination of the high temperature Curie point transformation characteristic of barium titanate. Consequently, the temperature range of usefulness of these materials as capacitors with high dielectric constant is broadened considerably relative to that of barium titanate alone. To take some specific examples, the material which includes 1 percent by weight of cadmium columbate has a dielectric constant which drops slowly from a value of 1265 at 20° C. to 1200 at 65° C. and then rises uniformly to a Curie point peak of 3200 at 114° C. This may be compared with a normal Curie point peak for barium titanate which is of the order of 6000. For a composition containing about 10 percent cadmium columbate, the dielectric constant is quite uniform from 10° C. to 100° C., having a value of about 1000, and a slight Curie point maximum of 1400 at 115° C. For this material, the dissipation factor decreases uniformly, going through a slight maximum equivalent to a value of .115 at 38° C., the value dropping to .02 at 115° C. A material which contains about 20 percent cadmium columbate has a dielectric constant which remains quite uniform at about 550 from 20° C. to 120° C., showing only a slight rise to a value of about 600 at 115° C. The dissipation factor, however, shows a sharp maximum of .22 at 14° C. and this factor decreases regularly to .022 at 120° C.

The materials comprising barium titanate and cadmium columbate may be prepared by the general method described for the sodium or potassium columbate or tantalate addition materials, as described in Example 1. A more detailed description of the preparation of cadmium columbate or tantalate is found in a copending application of Samuel Bousky, Serial No. 229,533, filed June 1, 1951.

An example of preparation will now be given:

EXAMPLE II 2 mols of pure cadmium oxide are mixed with 1 mol of columbium or tantalum oxide and the mixture is then ground to an impalpable powder. The powder is then calcined in air or oxygen at a temperature of about 2100° F., for about

TABLE 2

$BaTiO_3$—$CdCbO_3$

Fired in an oxygen atmosphere

| Composition | Firing Temperature, °F. | Before Aging | | After Aging | |
|---|---|---|---|---|---|
| | | ε | D | ε | D |
| 1. 100% $BaTiO_3$ | 2,450 | 1,320 | 0.05 | 1,330 | 0.04 |
| 2. 99% $BaTiO_3$–1% $CdCbO_3$ | 2,450 | 1,260 | 0.26 | 1,265 | 0.08 |
| 3. 98% $BaTiO_3$–2% $CdCbO_3$ | 2,450 | 1,220 | 0.38 | 1,240 | 0.12 |
| 4. 95.25% $BaTiO_3$–4.75% $CdCbO_3$ | 2,425 | 1,040 | 0.34 | 1,140 | 0.16 |
| 5. 90.9% $BaTiO_3$–9.1% $CdCbO_3$ | 2,400 | 700 | 0.10 | 1,000 | 0.04 |
| 6. 87% $BaTiO_3$–13% $CdCbO_3$ | 2,350 | 530 | 0.09 | 650 | 0.03 |
| 7. 83.4% $BaTiO_3$–16.6% $CdCbO_3$ | 2,100 | 440 | 0.30 | 550 | 0.04 |

In those ceramics which comprise barium titanate and cadmium columbate, a maximum dielectric constant is obtained by the addition of about 1 percent of the columbate. Dissipation 20 to about 45 minutes in the case of the columbate, or 2300° F. in the case of the tantalate. Optimum properties are obtained by using the lowest possible temperature of calcination, the shortest time at the peak temperature, and the highest obtainable oxidation potential. The binary is then made by mixing the required amounts of barium titanate and cadmium columbate, for example, 90 percent by weight of the former and 10 percent by weight of the latter. The mixture is ground to an impalpable powder, a temporary binder such as a water solution of polyvinyl alcohol or methyl cellulose is added, the material is molded into a shape convenient for firing, and the body is fired in oxygen or air to the temperature indicated in Table 2, and maintained at the firing temperature for a length of time sufficient to develop complete vitrification.

When initially made, the electrical properties of these bodies are relatively poor but, after standing at room temperature from 2 weeks to a month, the dielectric constants tend to increase and the dissipation factors decrease considerably. This aging effect may be greatly speeded up by annealing the bodies after firing at a temperature of about 1000° F. for at least ½ hour.

In connection with the values for dissipation factor given in the above tables it is to be understood that this property is a highly variable quantity sharply affected by humidity conditions prevailing at the time of measurement, slight changes in mode of firing, and variation in application of electrodes. Generally speaking, a precise value of dissipation factor for a particular dielectric can be obtained only by rigidly controlling all variables in manufacture and assembly which might affect the properties. It is usually safer to use an average value measured on many bodies than a single value measured on any one sample.

In addition to the useful electrical properties mentioned previously, the ceramic materials comprising barium titanate and sodium columbate or tantalate have been found to exhibit ferroelectric and piezoelectric properties.

In general, the materials of the present invention are useful as the ceramic dielectric portions of capacitors used as bypass elements in communications circuits where the temperature tends to rise unduly. Excess temperature rise may be caused by high power dissipation in the circuit as a whole, or crowding together of vacuum tubes and capacitors as a result of miniaturization. The trend in miniaturization of circuits has resulted in greatly increased demand for circuit elements which will retain stable operation over broad temperature ranges.

Certain high dielectric ceramic materials now in use, such as unmodified barium titanate, maintain their rated capacitance, dissipation, and breakdown values up to about 80° C. If the temperature rises substantially higher than this, marked changes in these properties occur resulting in failure of circuit elements.

Materials of the present invention maintain substantially their rated electrical values up to about 150° C. and their dissipation and breakdown characteristics improve with rise in temperature.

I claim as my invention:

1. A vitreous ceramic material comprising barium titanate and a substance from the class consisting of sodium and potassium columbates and tantalates, the percentage by weight of said sodium or potassium compounds being within the range of about 0.5 and about 50.

2. A material according to claim 1 in which said substance is sodium columbate.

3. A material according to claim 2 in which the percentage of said substance is about 2.

4. A material according to claim 1 in which said substance is potassium columbate.

5. A material according to claim 4 in which the percentage of said substance is about 2.

6. A method of preparing a temperature stabilized high dielectric constant body comprising mixing together powdered barium titanate and a substance from the class consisting of sodium and potassium columbates and tantalates, the percentage by weight of said sodium or potassium compounds being within the range of about 0.5 and 50, molding said mixture into a coherent body, and firing said body in an oxidizing atmosphere at temperatures between about 2200° and 2600° F. for at least 20 minutes.

7. A method according to claim 6 in which said atmosphere consists essentially of oxygen.

8. A method according to claim 6 in which said atmosphere is air.

EUGENE WAINER.

No references cited.